(12) United States Patent
Ressler

(10) Patent No.: US 7,546,195 B2
(45) Date of Patent: Jun. 9, 2009

(54) METHOD FOR CONTROLLING VEHICLE AIRBAG STATUS DURING A VEHICLE DYNAMIC SITUATION

(75) Inventor: Galen E. Ressler, White Lake, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 377 days.

(21) Appl. No.: 11/458,406

(22) Filed: Jul. 19, 2006

(65) Prior Publication Data

US 2008/0021615 A1    Jan. 24, 2008

(51) Int. Cl.
*B60R 22/00* (2006.01)

(52) U.S. Cl. .................. 701/45; 180/274; 280/734

(58) Field of Classification Search .................. 701/45; 180/271, 274; 280/728.1, 734; 340/436
See application file for complete search history.

(56) References Cited

U.S. PATENT DOCUMENTS 7,260,461 B2 *   8/2007   Rao et al. ..................... 701/45

* cited by examiner

*Primary Examiner*—Mark Hellner

(57) ABSTRACT

The present invention provides a method for controlling vehicle airbag status during a vehicle dynamic situation. The method initially includes estimating an occupant classification. This estimation may, for example, be based on the occupant's weight. Thereafter, a plurality of indicators which may signify an impending vehicle dynamic situation are evaluated. If any of the indicators signify an impending vehicle dynamic situation, the occupant classification is held constant. Therefore, the events of the vehicle dynamic situation are prevented from contributing to an incorrect occupant classification.

14 Claims, 1 Drawing Sheet

METHOD FOR CONTROLLING VEHICLE AIRBAG STATUS DURING A VEHICLE DYNAMIC SITUATION

TECHNICAL FIELD

The present invention pertains generally to a method for controlling airbag status during a vehicle dynamic situation.

BACKGROUND OF THE INVENTION

It is well known to establish a vehicle occupant classification such as, for example, by measuring the weight of an occupant. Vehicle occupant classification information identifies the type of occupant seated within a vehicle and generally includes the following three categories: adult, child, or none. This information may be useful, for example, in determining whether or not to deploy an airbag. As an example, it may be desirable to deploy an airbag under certain circumstances if the vehicle occupant in a particular seat is an adult, but the airbag may not be deployed if the vehicle occupant is a child or if the particular seat is empty.

SUMMARY OF THE INVENTION

The present invention provides a method for controlling airbag status during a vehicle dynamic situation. The method initially includes estimating an occupant classification. This estimation may, for example, be based on the occupant's weight. Thereafter, a plurality of indicators which may signify an impending vehicle dynamic situation are evaluated. If any of the indicators signify an impending vehicle dynamic situation, the occupant classification is held constant. Therefore, the events of the vehicle dynamic situation are prevented from contributing to an inappropriate change of occupant classification.

The step of evaluating a plurality of indicators may include checking an antilock brake system status.

The step of evaluating a plurality of indicators may include checking the vehicle's speed.

The step of evaluating a plurality of indicators may include checking the degree of brake system application.

The step of evaluating a plurality of indicators may include checking a stability control system status.

An alternate method of the present invention is also adapted to control airbag status. The alternate method initially includes estimating an occupant classification, and thereafter selecting an air bag status based on the estimated occupant classification. A plurality of indicators which may signify an impending vehicle dynamic situation are then evaluated. If any of the indicators signify an impending vehicle dynamic situation, the air bag status is held constant. Therefore, the events of the vehicle dynamic situation are prevented from contributing to an inappropriate air bag status change.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
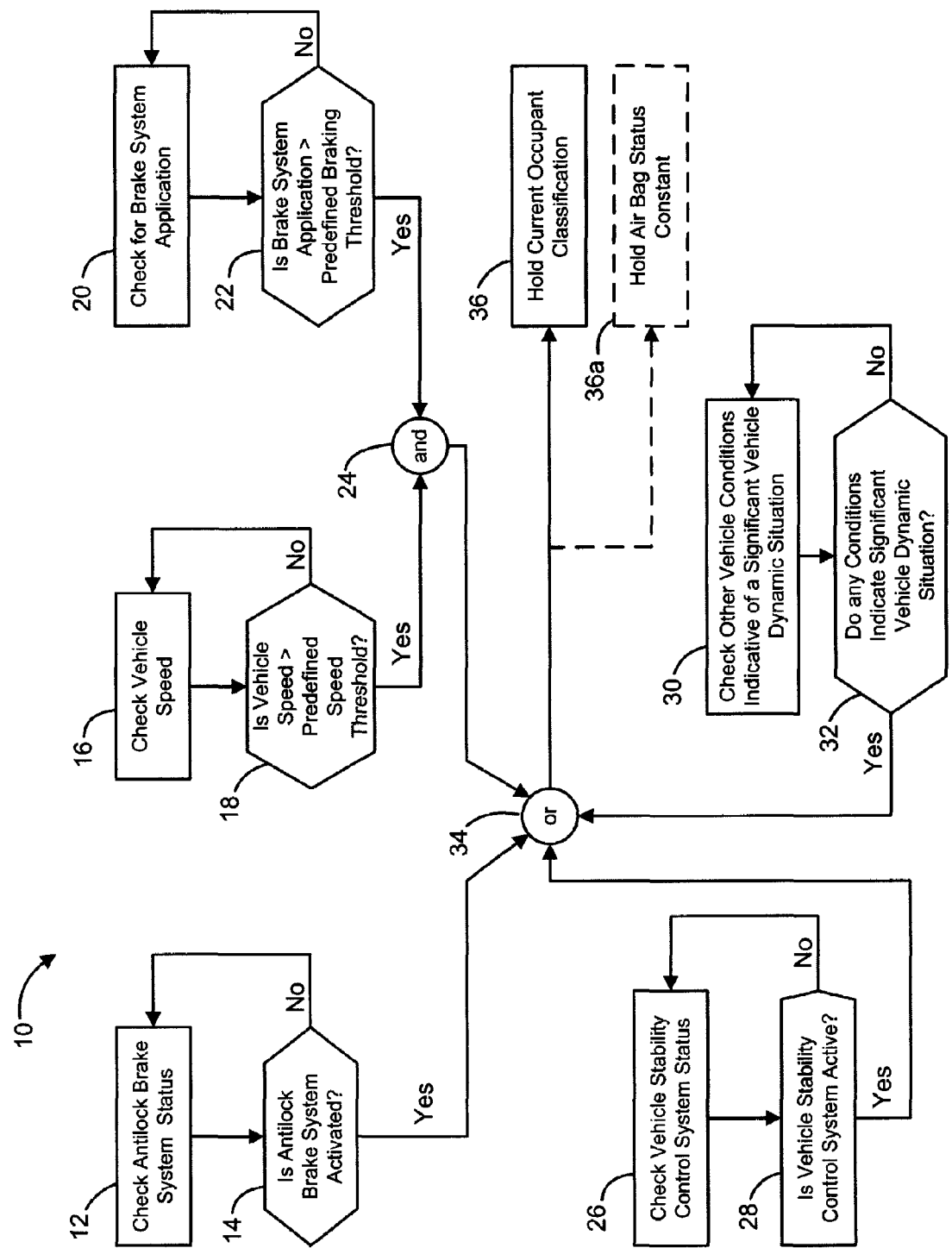
FIG. 1 is a flow chart illustrating a method in accordance with the preferred embodiment of the present invention.

Referring to the drawings, wherein like reference numbers refer to like components, FIG. 1 shows method 10 (also referred to herein as algorithm 10) in accordance with the present invention. More precisely, FIG. 1 shows a block diagram representing steps performed by a control module (not shown).

At step 12, the algorithm 10 checks the status of the vehicle's antilock brake system. At step 14, if the vehicle's antilock brake system is not activated, the algorithm 10 returns to step 12 and continues checking for antilock brake activation. At step 14, if the vehicle's antilock brake system is activated, a positive (i.e., "yes" or "true") indication is transmitted to the logic gate at step 34 which will be described in detail hereinafter.

At step 16, the algorithm 10 checks the vehicle's current speed. At step 18, the algorithm 10 determines whether the vehicle's current speed exceeds a predefined speed threshold (e.g., 45 mph). If at step 18 the vehicle's current speed does not exceed the predefined speed threshold, the algorithm 10 returns to step 16 and continues checking the current vehicle speed. If at step 18 the vehicle's current speed does exceed the predefined speed threshold, a positive indication is transmitted to the logic gate at step 24 which will be described in detail hereinafter.

At step 20, the algorithm 10 checks the degree to which the vehicle's brake system is applied. The degree of brake system application may, for example, be estimated by monitoring the brake pedal position. Alternatively, the degree of brake system application may be estimated by monitoring the pressure in the brake system with a conventional pressure sensor. At step 22, the algorithm 10 determines whether the degree to which the vehicle's brake system is applied exceeds a predefined braking threshold (e.g., 40% applied). If at step 22 the degree of brake system application does not exceed the predefined braking threshold, the algorithm 10 returns to step 20 and continues checking the brake system. If at step 22 the degree of brake system application does exceed the predefined braking threshold, a positive indication is transmitted to the logic gate at step 24.

While the predefined speed and braking thresholds of steps 18 and 22 have been described as being independent, they may be correlated with each other. In other words, the predefined speed threshold may decrease as the predefined braking threshold increases and vice versa. For example, if the vehicle is traveling relatively slowly (e.g., 15 mph), the conditions of steps 18 and 22 can both be met only if a relatively large amount of braking is applied (e.g., 60% application). Conversely, if the vehicle is traveling relatively quickly (e.g., 65 mph), the conditions of steps 18 and 22 can both be met if only a relatively small amount of braking is applied (e.g., 30% application).

The logic gate of step 24 is an "and gate" meaning that a positive indication is transmitted to the logic gate at step 34 only if both inputs into the logic gate 24 are positive. If either or both of the inputs into the logic gate 24 are negative, the algorithm 10 transmits a negative indication to the logic gate 34.

At step 26, the algorithm 10 checks the status of the vehicle's stability control system. As is known in the art, a "stability control system" is a vehicle system configured to retain control of a vehicle during certain dynamic events. For example, if the vehicle is skidding, the stability control system may reduce engine output and/or apply the brake system in a manner adapted to regain traction. At step 28, if the vehicle's stability control system is not activated, the algorithm 10 returns to step 26 and continues checking for stability control system activation. At step 28, if the vehicle's stability control system is activated, a positive indication is transmitted to the logic gate at step 34.

At step 30, the algorithm 10 checks any other vehicle conditions which may be indicative of a significant vehicle dynamic situation such as a collision. The specific indicative conditions may differ depending on the type of vehicle. As an example, a vehicle having an automatic crash preparation system may provide information indicative of a significant vehicle dynamic situation. As a further example, a radar system configured to measure the proximity of foreign objects may also provide information indicative of a significant vehicle dynamic situation. At step 32, if no conditions indicative of a significant vehicle dynamic situation have been identified, the algorithm 10 returns to step 30. At step 32, if any condition indicative of a significant vehicle dynamic situation has been identified, a positive indication is transmitted to the logic gate at step 34.

The logic gate of step 34 is an "or gate" meaning that if at least one of the inputs thereto are positive, the algorithm 10 proceeds to step 36. If none of the inputs to the logic gate of step 34 are "yes", the occupant classification status is not adjusted by the method of the present invention and is therefore calculated in a conventional manner.

The inputs into the logic gate of step 34 are indicators intended to signify an impending significant vehicle dynamic situation such as a collision. It should, however, be appreciated that the present invention does not require all of the indicators shown in FIG. 1. As an example, a vehicle without antilock brakes can implement the method of the present invention by focusing on the remaining indicators to anticipate a significant vehicle dynamic situation.

At step 36, the algorithm 10 holds constant the current occupant classification. Vehicle occupant classification information identifies the type of occupant seated within a vehicle and generally includes the following three categories: adult, child, or none. This information may be useful, for example, in determining whether or not to deploy an airbag. As an example, it may be desirable to deploy an airbag under certain circumstances if the vehicle occupant in a particular seat is an adult, but the airbag may not be deployed if the vehicle occupant is a child or if the particular seat is empty.

Occupant classification estimation is well known and is generally based on relevant quantifiable data such as, for example, the occupant's weight. Such data may change to reflect the events of a significant vehicle dynamic situation and thereby yield a false indication of the occupant's classification. As an example, a relatively large measured weight indicative of an adult occupant may be reduced thereby indicating a child classification during heavy vehicle braking which moves the occupant toward the edge of the seat.

In response to one or more indications of an impending significant vehicle dynamic situation, step 36 assumes that the occupant classification (i.e., adult, child or empty) should not change during a subsequent dynamic situation and therefore holds the current occupant classification constant as long as the output of the logic gate of step 34 is positive, up to a pre-defined period of time. Accordingly, by preventing the occupant classification from changing during a subsequent dynamic situation, step 36 eliminates the potential for a false indication of the occupant's classification based data which changes to reflect the events of the vehicle dynamic situation.

According to an alternate embodiment of the present invention, step 36 may be replaced by step 36a such that the air bag status is held constant rather than the occupant classification. Step 36a assumes that the air bag status (i.e., activated or deactivated) should not change during a subsequent dynamic situation and therefore holds the current air bag status constant. Accordingly, by preventing the air bag status from changing during a subsequent dynamic situation, step 36a eliminates the potential for an inappropriate air bag status caused by a false indication of the occupant's classification which changes to reflect the events of the vehicle dynamic situation. It should be appreciated that steps 36 and 36a perform substantially the same function in a slightly different manner and are therefore interchangeable.

While the best modes for carrying out the invention have been described in detail, those familiar with the art to which this invention relates will recognize various alternative designs and embodiments for practicing the invention within the scope of the appended claims.

The invention claimed is:

1. A method for preserving occupant classification information during a vehicle dynamic situation comprising:
   estimating an occupant classification;
   evaluating a plurality of indicators which may signify an impending vehicle dynamic situation; and
   holding said occupant classification constant if any of said plurality of indicators signify an impending vehicle dynamic situation, such that the events of the vehicle dynamic situation are prevented from contributing to an incorrect occupant classification.

2. The method of claim 1, wherein said evaluating a plurality of indicators includes checking an antilock brake system status.

3. The method of claim 1, wherein said evaluating a plurality of indicators includes checking the vehicle's speed.

4. The method of claim 1, wherein said evaluating a plurality of indicators includes checking the degree of brake system application.

5. The method of claim 1, wherein said evaluating a plurality of indicators includes checking a stability control system status.

6. The method of claim 1, wherein said estimating an occupant classification includes weighing an occupant.

7. A method for controlling vehicle airbag status during a vehicle dynamic situation comprising:
   estimating an occupant classification;
   selecting an air bag status based on said occupant classification;
   evaluating a plurality of indicators which may signify an impending vehicle dynamic situation; and
   holding said air bag status constant if any of said plurality of indicators signify an impending vehicle dynamic situation, whereby the events of the vehicle dynamic situation are prevented from contributing to an inappropriate air bag status.

8. The method of claim 7, wherein said evaluating a plurality of indicators includes checking an antilock brake system status.

9. The method of claim 7, wherein said evaluating a plurality of indicators includes checking the vehicle's speed.

10. The method of claim 7, wherein said evaluating a plurality of indicators includes checking the degree of brake system application.

11. The method of claim 7, wherein said evaluating a plurality of indicators includes checking a stability control system status.

12. The method of claim 7, wherein said estimating an occupant classification includes weighing an occupant.

13. A method for preserving occupant classification information during a vehicle dynamic situation comprising:

estimating an occupant classification;
evaluating a plurality of indicators which may signify an impending vehicle dynamic situation, including:
checking an antilock brake system status;
checking the vehicle's speed;
checking the degree of brake system application; and
checking a stability control system status; and holding said occupant classification constant if any of said plurality of indicators signify an impending vehicle dynamic situation, whereby the events of the vehicle dynamic situation are prevented from contributing to an incorrect occupant classification.

14. The method of claim 13, wherein said estimating an occupant classification includes weighing an occupant.

* * * * *